L. H. MAUS.
STEAM-BOILER AND FLOURING-MILL COMBINED.
No. 173,174. Patented Feb. 8, 1876.
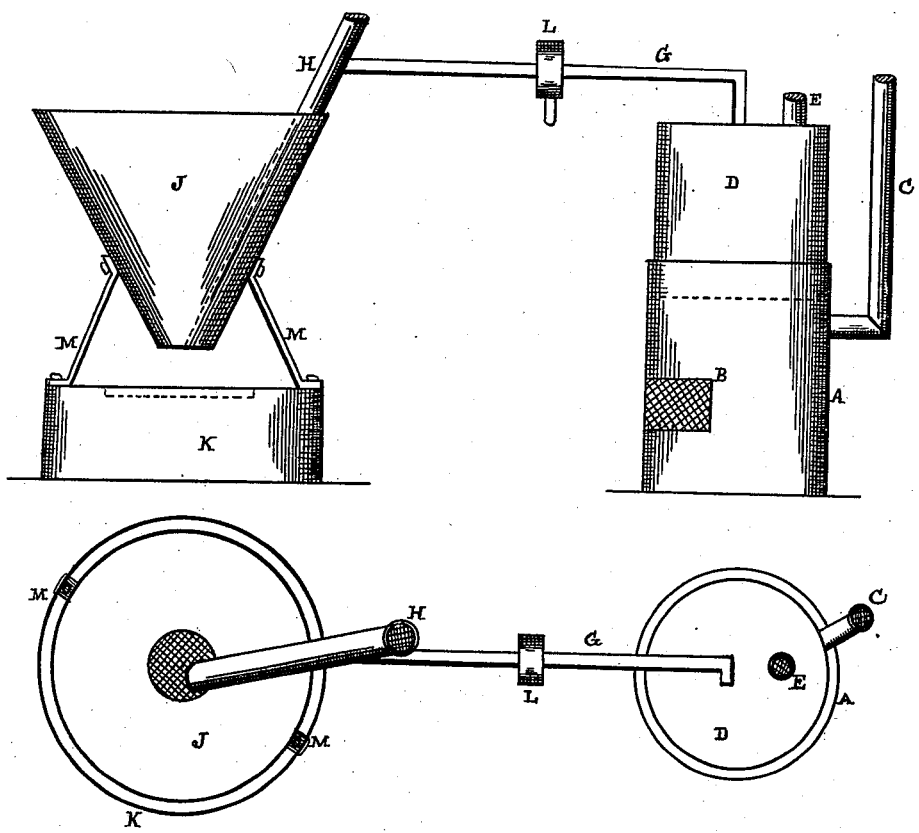

UNITED STATES PATENT OFFICE.

LEWIS H. MAUS, OF MILLERSTOWN, PENNSYLVANIA.

IMPROVEMENT IN STEAM-BOILERS AND FLOURING-MILLS COMBINED.

Specification forming part of Letters Patent No. 173,174, dated February 8, 1876; application filed July 15, 1875.

*To all whom it may concern:*

Be it known that I, LEWIS H. MAUS, of Millerstown, Perry county, State of Pennsylvania, have invented a new and useful Steam-Boiler and Flouring-Mill Combined, so as to apply steam to the wheat in the hopper to steam the wheat before it reaches the mill-burrs; and I do hereby declare the following to be an exact description thereof, reference being had to the accompanying drawings, and to the letters of reference marked thereon, making a part of this specification, in which—

Figure 1 represents a side elevation of the heater, boiler, hopper, burrs, and steam connecting-pipes combined. Fig. 2 shows a top view of the same.

The nature of my invention consists in the construction and combination of a heater, boiler, hopper, burrs, and connecting steam-pipes, when arranged and operating so as to apply steam to the wheat in the hopper, to steam the wheat before it reaches the mill-burrs.

A represents the heater, with its fire-place B and smoke or draft pipe C; D, the boiler above the heater, with its reception-pipe E, to fill the boiler with water, and connecting steam-pipe G, through which the steam is passed to the grain-pipe H, the grain-pipe extending to the bottom of the hopper J, so as to apply the steam to the wheat in the hopper, and steam the wheat before it reaches the mill-burrs K; L, a circular receptacle and tube, to let off condensed steam. M M are supports that brace the hopper and sustain its proper position.

The object in steaming the grains of wheat before they reach the mill-burrs is to toughen the shell of the wheat in very dry or cold weather—not cut the bran up—so that no fine bran gets into the flour, but make superior flour.

From the steam-boiler L the steam is conducted through the horizontal pipe G to the incline-pipe H, which extends down the inside of the hopper to the mouth or discharge-orifice, so as to completely steam the grain as it passes from the hopper, and prevent the grain from clogging in the hopper.

I am aware that grain has been moistened by the application of the "atmosphere of steam" before and while passing into or from the hopper; but this I do not claim. Therefore,

What I claim as my invention, and desire to secure by Letters Patent, is—

The inclined pipe H, connected with the boiler D by the horizontal pipe G, in combination with the hopper J, and attached to the inside thereof, and extending through it to the bottom, so as to steam the grain as it passes from the hopper, for the purposes herein set forth.

LEWIS H. MAUS.

Witnesses:
J. S. CASTLES,
C. I. WRIGHT.